3,017,407
PROCESS FOR PRODUCING POLYSULFURIC ACID ESTERS OF POLYSACCHARIDES
Francis J. Petracek, Canoga Park, and Marshall D. Draper, Woodland Hills, Calif., assignors to Riker Laboratories, Inc., Los Angeles, Calif., a corporation of Delaware
No Drawing. Filed Aug. 18, 1958, Ser. No. 755,387
19 Claims. (Cl. 260—234)

The present invention relates to substances capable of inducing lipemia-clearing activity and to processes for preparing such substances.

It was first shown by Hahn (Science, 98; 19 (1943)) that heparin, a natural sulfated polysaccharide, possessed antilipemic or lipemia-clearing properties in vivo. Gofman et al. (Circulation, 2; 161 (1950)) showed that heparin "wipes out" the giant lipoprotein molecules which accumulate in the blood of atherosclerotic patients and alimentary lipemic rabbits. It has further been shown that heparin prevents the development of atherosclerosis in cholesterol-fed rabbits, presumably by activating the "lipemia-clearing factor" (LCF) and thus promoting enzymatic lipolysis in the blood stream (Graham et al., Circulation, 4; 666 (1951)); Constantinides, P., et al., A.M.A. Arch. Path., 56: 36 (1953); Horlick, L., et al., A.M.A. Arch. Path., 57: 417 (1954)).

Prolonged heparin treatment of human patients is limited however, by a certain risk of internal bleeding (MacMillan and Brown, Can. Med. Assoc. Journ., 69: 279 (1953)) by the necessity for parenteral administration, its shortlasting effects, and by the high cost of this drug. In view of these disadvantages of heparin, various efforts have been made to find a satisfactory substitute for heparin which would provide a less costly and more generally available antilipemic agent without the concomitant high anticoagulant activity which would be suitable for clinical use. Many substances which may be considered chemically somewhat similar to heparin have been investigated in an effort to determine whether they would be of value as antilipemic agents (Constantinides et al., Arch. Int. Pharmacodyn., 99: 334 (1954)); Hladovec et al., Experientia, 13 (May 1957), 190–1). However these substances have been inadequately characterized chemically and have been non-reproducible; the process for preparing them has not been disclosed or they have been attended by toxic side effects. In substances of this type, side effects have been vomiting, vasomotor collapse, parasthesias, angioneurotic edema, elevation of non-protein nitrogen and alopecia [Hirschboeck, J. S., et al., Am. Journ. Med. Sci., 227 (March 1954) 279–82]. Thus the various sulfated polysaccharides have been shown to possess antilipemic activity similar to that of heparin; but none have been considered suitable for clinical administration as antilipemic agents.

An object of the invention is to provide novel antilipemic substances which are non-toxic.

A further object is to provide novel processes for producing such substances easily, reproducibly and on a large scale.

An additional object is to provide novel antilipemic agents from corn starch dextrin and corn syrup saccharides.

Additional objects will be apparent to those skilled in the art from reading the present description.

The antilipemic or lipemia-clearing agents of the invention comprise sulfated polysaccharides selected from the group consisting of corn starch dextrin and corn syrup solids containing an average of between about 5 and 15, and preferably between about 8 and 12, glucose units per molecule, joined predominantly by alpha 1,4 and to a lesser extent by alpha 1,6 linkages, and containing between about 1.5 and 3, preferably between about 2 and 3, sulfate groups per glucose unit. These antilipemic agents are desirably employed in the form of their water-soluble salts of a non-toxic cation. The alkali-metal salts, such as potassium and sodium salts are preferred. The potassium salts are preferred where the patient must limit his sodium intake. The antilipemic agents of the invention, having the prescribed degree of polymerization (average number of glucose units per molecule) and number of sulfate groups per glucose unit, provide agents having unusually low toxicity to permit their administration at a clinically useful level and thereby insure satisfactory lipemia clearing activity, without a concomitant increase in anticoagulant activity.

The average number of glucose units per molecule of the antilipemic agent and the number of sulfate groups each affect the average molecular weight of the product. The molecular weight is also affected by the nature of the cation which provides the salt, the molecular weight being higher for potassium salts than sodium salts. In general, it is preferred to employ antilipemic agents having an average molecular weight of between about 2600 and 6000, with best results obtained between about 3500 and 5500. Below an average molecular weight of 2600, the products tend to have lower antilipemic activity, while above 6000, the products tend to have both lower antilipemic activity and a substantial anticoagulant activity, as well as toxic properties.

In Table 1 below are listed the antilipemic activity (reported in terms of Grossman Units in accordance with the method described in the Journal of Laboratory and Clinical Medicine, 43 [1954], 445) and anticoagulant activity (reported in terms of clotting times in accordance with the well-known Lee-White Method) for various potassium salts of antilipemic agents according to the present invention, having various average numbers of glucose units per molecule and various numbers of sulfate groups per glucose unit:

TABLE 1

| Degree of polymerization (average number of glucose units per molecule) | Number of sulfate groups per glucose unit | Antilipemic activity (Grossman Units) | Anticoagulant activity (clotting time in minutes) |
|---|---|---|---|
| 12.8 | 2.48 | 1.07 | 10.5 / 12.0 |
| 8.6 | 2.76 | 4.94 | 10.0 / 10.5 |
| 9.45 | 2.35 | 6.15 | 13.5 / 7.5 |
| 9.40 | 2.23 | 6.60 | 10.0 / 10.0 |
| 6.50 | 2.38 | 1.29 | 8.0 / 9.0 |

The present invention also comprises a novel method of producing the antilipemic agents of the invention. In general, the process comprises sulfating corn starch dextrin or corn syrup solids containing an average of between about 1 and 20 glucose units per molecule (preferably between 5 and 15), employing chlorosulfonic acid as the sulfating agent and pyridine or a pyridine type base, such as the picolines and their mixtures, as a reaction medium and acid-acceptor. The pyridine or pyridine base reaction medium also assists in providing more controllable reaction conditions. Either after or before sulfation, or both, the corn syrup solids or corn starch dextrin is fractionated, if necessary, so that the final product will contain an average of between about 5 and 15, and preferably between 8 and 12, glucose units per molecule.

By employing as starting materials corn starch dextrin or corn syrup solids which have an average number of glucose units per molecule substantially within the range desired in the final product, the present invention takes advantage of mild reaction conditions to perform the sulfation without depolymerization of the corn starch dextrin or corn syrup solids to any substantial degree. By conducting the sulfation operation under mild conditions, at a temperature below 55° C., for short periods of time, such as less than 6 hours, it is possible to obtain excellent yields of the antilipemic agents of the invention having reliable and known molecular sizes and the proper degree of sulfation. The process provides excellent yields, great ease of sulfation and prevention of the formation of unwanted dark colored by-products, which have plagued prior art sulfation processes.

By employing corn starch dextrin or corn syrup solids of known molecular size and sulfating the material in accordance with the process of the invention, a means is provided to obtain antilipemic agents being substantially free of toxic properties. That is, of course, an important advantage of the invention since it is generally necessary for the patient to take lipemic-clearing agents in substantial and constant amounts over an extended period of time. This freedom from toxicity is believed to be in part a result of the ease of controlling molecular size and degree of sulfation and in the freedom of unwanted degradation products. Since the process of sulfation does not substantially degrade or depolymerize the polysaccharides, the final product is substantially unchanged from the starting material in molecular size. Where the starting material contains an average number of glucose units outside of the 5 to 15 glucose unit range required for the antilipemic agents of the invention, it is necessary to fractionate the product to remove some of the molecules containing less than or more than the prescribed number of glucose units, until the desired average is obtained.

The process of the present invention also desirably employs formamide or N,N-dimethyl formamide, in which corn syrup solids and corn starch dextrin are soluble, as a partial substitute for the pyridine or pyridine base in the reaction medium. These materials may be employed as a substitute for from about 10 to 50% by weight of pyridine or pyridine type base. The use of formamide or dimethyl formamide in the reaction medium provides a more homogeneous reaction medium, more uniform sulfation and reduction in cost. Where pyridine or a pyridine type base alone is employed as the reaction medium, difficulties are frequently encountered in that the polysaccharides tend to undergo "balling" or lumping. Also, the reaction is not as controllable and the product tends to undergo some depolymerization and unwanted color is introduced into the finished product. The use of formamide or dimethyl formamide is also important in that it facilitates subsequent fractionation to obtain a product containing the desired number of glucose units per molecule.

The corn starch dextrin and corn syrup solids employed as starting materials are well known, commercially available products which are produced to comply with well-defined and consistent specifications. It has been found that 43° Baumé corn syrup solids provide excellent results. These materials provide significant advantages as source materials in the sulfation process of the invention. Because they are available in substantially the molecular weight range desired, they may be sulfated under conditions which cause no further depolymerization which would lower the molecular weight of the final product. Thus greater control of the molecular weight of the final product is made possible. Where necessary, the product after sulfation may be fractionated as in Example 2 hereinbelow to provide the desired molecular size range. The polysaccharide starting material may be subjected to an initial fractionation to give a selected molecular weight range and then sulfated without substantial degradation and then subjecting the resulting sulfated polysaccharide to a final fractionation to further limit the molecular size of the product. This feature is disclosed in Example 1 hereinbelow. When 43° Baumé corn syrup solids are employed as the starting material, it is desirable to fractionate it prior to sulfation since 65% by weight of the solids lies in a molecular size range of 1 to 4 glucose units, which is below the desired average. This type of fractionation is demonstrated by Example 4 hereinbelow.

After fractionation, the reaction product may be treated with a suitable precipitant which will cause precipitation of the polysaccharide sulfate salt of the pyridine base. The precipitant may be an organic liquid in which the salt is insoluble, such as an organic oxygenated solvent miscible with water, including the lower alkanols or acetone. The precipitated pyridine salt may be redissolved in water, neutralizing with an alkali and then the alkali salt of the sulfated polysaccharide precipitated by adding a lower alkanol or acetone or, alternatively, adding an inorganic salt of the alkali, such as potassium chloride.

An alternate means of recovering the reaction product is to add it to water, the quantity of which is calculated to produce a saturated solution of the inorganic salts formed on subsequent neutralization with the calculated quantity of alkali. This results in the separation of the alkali salt of polysaccharide sulfate.

Previously, approximate average molecular weights of sulfated polysaccharides were determined by viscosity, osmotic pressure and light-scattering methods. These methods, especially viscosity procedures, are very inaccurate in the range (5–15 glucose units per molecule) of active antilipemic polysaccharide sulfates of the invention. We have modified an existing method of end-group analysis for polysaccharides so that it is applicable to polysaccharide sulfates with a good degree of accuracy. The end group analysis is done using the Kiliani reaction according to the procedure described by V. L. Frampton et al. in Analytical Chemistry, volume 23 (1951), page 1244. The modification derives from the use of maltose sulfate (2 units) as a reference standard, in order to correct for the incomplete reaction of the sulfated polysaccharides. If K is the conversion factor for the percentage by weight of material converted to the cyanhydrin and $n$ is number of sulfate groups per glucose unit then when $n$ is from 2 to 3, $K=0.40(3-n)$; where $n<2$, $K=1.65-0.65n$. The measured amount of ammonia is corrected by dividing by K.

Furthermore we have applied the use of specific rotations to our sulfated materials in order to gain more exact knowledge of the molecular weights in the lower ranges. (Freudenberg, Ber. 71, 2505 (1938).) Using the optical rotation method, the average degree of polymerization (DP) is calculated from the expression:

$$DP = \frac{M}{162 + 118N} \text{ (for potassium salts)}$$

or $$\frac{M}{162 + 102N} \text{ (for sodium salts)}$$

where $M$=average molecular weight of the product, $N$=number of sulfate groups per glucose unit.

The average molecular weight of the product (M) is calculated from the expression:

$$M = \frac{147.3f(444 + 204N)}{200f - [\alpha]D}$$

where $$f = \frac{264}{264 + 102N} \text{ (for sodium salt)}$$

or $$M = \frac{147.3f(444 + 236N)}{200f - [\alpha]D}$$

where $$f = \frac{280}{280 + 118N} \text{ (for potassium salt)}$$

$\alpha_D$ = specific optical rotation of the product.

The value of N is obtained from the expression:

$$N = \frac{162(S/100)}{32 - 118(S/100)} \text{ (for potassium salt)}$$

or $$= \frac{162(S/100)}{32 - 102(S/100)} \text{ (for sodium salt)}$$

where $S$ = percent of sulfur in product.

Thus the measurement of the specific optical rotation of the product $[\alpha]_D$ enables the degree of polymerization to be determined.

In order more clearly to disclose the nature of the present invention, the following examples illustrating the invention are disclosed. It should be understood, however, that this is done solely by way of example and is intended neither to delineate the scope of the invention nor limit the ambit of the appended claims. In the examples which follow, and throughout the specification, the quantities of materials are expressed in terms of parts by weight, unless otherwise specified.

*Example 1*

To 800 ml. of dry pyridine in a 3 liter-3 necked flask, was added 120 ml. of chlorosulfonic acid while the temperature was maintained between 10–20° C. The mixture was stirred for one hour at room temperature after the last addition of the acid. To the sulfating medium was added 75 gm. of dry corn starch dextrin (having an intrinsic viscosity $[\eta] = 0.068$ in 0.1 N potassium hydroxide) in 200 ml. of dry pyridine. The amount of chlorosulfonic acid employed constituted 4 moles of chlorosulfonic acid for each glucose unit of the corn starch dextrin. The mixture was heated for 10 hrs. on the steam bath with stirring and then was allowed to cool at room temperature. The upper pyridine layer was decanted from the lower solid cake and the cake was then dissolved in 400 ml. of water. The aqueous solution was poured with stirring into 5 liters of methanol and the residue (pyridine salt of the resulting corn starch dextrin sulfate) was dissolved in 1.75 liters of water containing 17.5 gm. sodium chloride. The solution was adjusted to pH 9 with 6 N sodium hydroxide and 5.25 liters of methanol was added to precipitate the sodium salt of the corn starch dextrin sulfate as a granular material which was washed with methanol and ether to give a yield of 223.5 gm. of material.

To a solution of 184.5 gm. of the above material in 3510 ml. of water and 32 gm. of sodium chloride was added 625 ml. of acetone. After standing overnight at 0° C. the filtrate was decanted from the lower syrupy layer (discarded) and to the filtrate was added 553 ml. of acetone and again allowed to stand overnight. The lower syrupy layer was recovered by trituration with methanol to yield 112.7 gm. of white granular corn starch dextrin sulfate material (59% yield) which had an average molecular size of 12 glucose units, an average molecular weight of 4300, and 2.0 sulfate groups per glucose residue. The product had a lipemia-clearing activity of 3.56 Grossman units (determined by the method described in the Journal of Laboratory and Clinical Medicine, volume 43, page 445 (1954)) and a coagulation time of 9.0 and 9.5 minutes when determined by the well-known Lee-White Method.

*Example 2*

(a) *Sulfation.*—25 gm. of solids produced from the dehydration Clinton Corn Products corn syrup 43° Baumé solids was obtained by means of triturating the corn syrup with acetone. The 25 gm. of corn syrup solids was added to 500 ml. of dry pyridine to which 60 ml. of chlorosulfonic acid had previously been added. The reaction mixture was then heated and stirred at 50–60° C. The mixture was then cooled and the pyridine decanted from the lower syrupy mass. The syrup was dissolved in 200 ml. of water and poured into 2 liters of methanol. After standing for ½ hour the supernatant liquid was decanted from the syrup, the syrup redissolved in 300 ml. of 1% aqueous sodium chloride solution and basified with approximately 55 ml. 6 N sodium hydroxide to pH 10. 2 liters of methanol were added to the aqueous solution causing precipitation of a white solid. After standing until the aqueous methanol solution became mostly clear, the solution was filtered. Yield of corn syrup solids sulfate was 65 grams.

(b) *Fractionation.*—50 gm. of this corn syrup solids sulfate was dissolved in one liter of 1% aqueous sodium chloride solution and then 330 ml. of acetone added. The mixture was placed in an ice box and allowed to stand overnight. The supernatant liquor was decanted from the syrup, and the syrup dried in vacuo to provide 11 grams a 0–25% fraction of sulfated corn syrup solids. Another 210 ml. of acetone was added to the supernatant fraction and the resulting mixture placed in a refrigerator at 10° C. overnight. The resulting supernatant layer was decanted and the syrup which remained was triturated with two volumes of methanol. The residue was filtered and the solids dried in vacuo. A yield of 12.6 grams of this 26–35% fraction of sulfated corn syrup solids was obtained. The two fractions had the following properties:

| Fraction | Number of sulfate groups per glucose unit | Average No. of glucose units per molecule | Mean antilipemic activity (Grossman Units) | Coagulation Time (Lee-White Method) Minutes | Molecular Weight |
|---|---|---|---|---|---|
| 0–25% | 2.57 | 9.1 | 5.85 | 10.8 | 3,858 |
| 26–35% | 2.36 | 7.1 | 3.77 | 10.3 | 3,124 |

*Example 3*

300 gm. of Staley's corn syrup solids produced from 43° Baumé corn syrup was heated to reflux with 1500 ml. of 6% formamide-methanol (90 ml. formamide made up to 1500 ml. with methanol) for one hour with stirring and the mixture allowed to cool and stand for 18 hours at room temperature. The methanol was decanted and the residue was triturated with acetone until granular, filtered and dried in vacuo. The yield was 106.0 gms.

53 gm. of the above corn syrup solids fraction was added to a formamide solution of sulfur trioxide complex of mixed picolines (240 ml. chlorosulfonic acid added slowly with cooling and stirring to 300 ml. of dry mixed picolines [Barrett 30-B] in 200 ml. formamide) and the solution heated at 45–50° C. for 5 hours with stirring. The solution was allowed to cool and was taken up into 100 ml. water and added to 4 liters of isopropanol. The mixture was allowed to stand 18 hours and the supernatant liquid decanted. The residue of syrup was dissolved in 1500 ml. of water, basified with 6 N potassium hydroxide solution (234 ml.) and 15 gm. potassium chloride added. Potassium salt of the corn syrup solids was precipitated with 4 liters of methanol, removed by filtration, washed with methanol and dried. The yield was 160 gms. of material containing 16.0% sulfur and having $$(\alpha)_D^{27} = +122°$$

50 gm. of the product obtained were dissolved in 1750 ml. 2% aqueous potassium chloride solution. This was cooled to 0° C. over 6 hrs. The granular residue was filtered off. The yield was 16.3 gms. (32.6% of the total solids). The solution was made up to 3% with potassium chloride and again cooled. The yield of residue was 9.3 gms. The two fractions had the following properties: The 2% potassium chloride fraction contained 17.1% sulfur, had an optical rotation $[\alpha]_D^{27}=+82.7°$, had 2.35 sulfur groups per glucose unit, an average of 9.44 glucose units per molecule, a molecular weight of 4150, a lipemia-clear activity of 5.1 Grossman Units and a coagulation time of 10.3 minutes. The 3% potassium chloride fraction contained 17.3% sulfur, had an optical rotation $[\alpha]_D^{27}=+81.4°$, had 2.41 sulfur groups per glucose unit, an average of 9.1 glucose units per molecule, a molecular weight of 4070, a lipemia-clear activity of 5.45 Grossman Units and a coagulation time of 10.0 minutes.

*Example 4*

(a) *Partial prefractionation.*—400 gms. of 43° Baumé corn syrup (Staley's Products) ($[\alpha]_D^{25}=+142°$, average chain length=2.5 glucose units per molecule) were refluxed with 2 liters of 5% formamide in methanol for 2 hrs. The hot solution was decanted off and the residue was dried in vacuo. The yield of the fraction was 154 gm. $[\alpha]_D=+163.5°$ (average chain length=4.05 glucose units per molecule).

(b) *Sulfation.*—120 ml. of chlorosulfonic acid was added, with cooling and stirring, to a mixture of 200 ml. of dry pyridine and 200 ml. of formamide, 50 gms. of material from step (a) was added and the mixture heated to 40–50° C. for 6 hrs. After the reaction period, the mixture was cooled and 200 ml. of water added. The aqueous solution was poured into 4 liters of isopropanol and allowed to stand overnight at room temperature. The isopropanol solution was decanted from the syrupy mass (pyridine salt of corn syrup solids sulfate) and discarded. The syrupy mass was dissolved in 1500 ml. of water and basified to pH 11 with 6 N potassium hydroxide; 15 gms. of potassium hydroxide was added to the basic solution and then 4 liters of methanol was added. The potassium salt of the corn syrup solids which precipitated was then collected on a Buchner funnel, washed with several portions of fresh methanol and dried. The yield was 152 gms. having $[\alpha]_D=65.9°$, average chain length=4.4 glucose units per molecule, and 16.2% sulfur.

(c) *Fractionation.*—50 gm. of the product from step (b) was dissolved in 1750 ml. of 1% aqueous potassium chloride and placed in an ice-bath for 6 hrs. The precipitated potassium salt of corn syrup solids was collected, washed with methanol and dried. The yield was 163 gms. having $[\alpha]_D^{25}=+83.9°$, an average chain length of 10.3 glucose units per molecule, and 17.2% sulfur, antilipemic activity of 5.42 Grossman Units and contained 2.38 sulfate groups/glucose unit.

*Example 5*

To 300 ml. of dry pyridine and 200 ml. of formamide was added 120 ml. of chlorosulfonic acid with constant stirring and cooling. To this mixture was then added 45 gm. of fractionated corn syrup solids (obtained as described in Example 4, step (a) hereinabove). The amount of chlorosulfonic acid employed constituted 6.6 moles of chlorosulfonic acid for each glucose unit of the corn syrup solids. The mixture was heated on a hot water bath for 5 hours at 45° C. To the reaction mixture was added 3 liters of water. The aqueous solution was basified to pH 11 with 6 N potassium hydroxide and then allowed to stand overnight. The solid residue of corn syrup solids sulfate was collected on a Buchner funnel, washed with methanol and dried. The yield was 91 gm. having 16.8% sulfur; 2.3 sulfate groups per glucose unit, $[\alpha]_D^{25}=+75.4$, an average molecular weight of 4130, an average of 9.72 glucose units per molecule, an antilipemic activity of 4.99 Grossman Units, and a coagulation time of 9.0 minutes.

*Example 6*

600 gm. of 43° Baumé corn syrup, 3 liters of methanol and 180 ml. of formamide were mixed together and refluxed for 1 hr. with stirring. The mixture was allowed to stand for 18 hrs. at room temperature and the supernatant methanol decanted. The residue was dissolved in 400 ml. of formamide and the remaining methanol removed by heating under vacuum at 90° C. at a pressure of 20 mm. of mercury for 2 hrs. The resulting formamide solution of corn syrup solids was then added to a sulfation mixture prepared by the slow addition, with ice cooling and stirring, of 480 ml. of chlorosulfonic acid to 1200 ml. mixed picolines and 400 ml. of formamide. The resulting mixture was heated at 55° C. for 1 hr. and then held at a temperature of 50° C. for 4 hrs. The cooled solution was poured into a slurry of 6 kg. of ice and 6 liters of water and made basic by the addition of 1.25 kg. of potassium hydroxide (85%). After standing for 18 hrs. at room temperature, the supernatant aqueous solution was decanted and the residual cake of potassium corn syrup solids sulfate was triturated with 1 liter of methanol, collected by filtration and dried; yielding 400 gm. of tan colored granular product. This material was dissolved in 1.6 liters of water and reprecipitated with 1.6 liters of methanol, the solid removed by filtration, washed with 1 liter of methanol and dried to yield 391 gm. of white powdery material. The product contained 17.2% sulfur, contained 2.38 sulfate groups per glucose unit, had a molecular weight of 4930, an optical rotation $[\alpha]_D^{27}=+84.9°$, an average of 11.0 glucose units per molecule and an antilipemic activity of 3.77 Grossman Units.

Several important advantages attend the practice of the present invention. First, the cost of manufacture is economical. Secondly, the product and process can be reproduced with considerable accuracy, in contrast to the great variation in products obtained by the processes of the prior art. Thirdly, there is provided greatly improved constancy of product having a satisfactory ratio of therapeutic to toxic dosage.

The toxicity of the products of the invention has been found to be much less than that of sulfated polysaccharides made by the prior art processes from high and intermediate molecular weight materials as measured by Astrup's technique for determining effect on platelet count after injection into rabbits.

The antilipemic agents of the present invention are effective per os only when administered parenterally. However, when these agents are administered with certain amino acids and polyamine-polyacid adjuvants, such as the so-caled "Versenates" (salts of ethylene diamine tetraacetic acid), they can be effective even though administered per os. Such invention is the subject matter claimed in the copending application of Emanuel Windsor, Serial No. 755,390, entitled "Orally-active Therapeutic Agents," filed concurrently with this application. The oral effectiveness of these combinations with adjuvants is illustrated by the following example:

*Example 7*

EFFECT OF POTASSIUM "VERSENATE" ON ORAL ABSORPTION OF THE POTASSIUM SALT OF POLYSACCHARIDE SULFATE IN HUMANS

Hard gelatin capsules were prepared each containing the following amounts of materials:

|  | Mgm. |
|---|---|
| Potassium salt of polysaccharide sulfate (having an average molecular size 8.6 glucose units, an average molecular weight 4200 and 2.76 sulfate groups per glucose unit produced from 43° Baumé corn syrup as in the process of Example 3, hereinabove) | 500 |
| Potassium "Versenate" (pH 7) | 250 |
|  | 750 |

Eight of these capsules were administered orally to five human subjects. Two hours after the administration of the drug, the plasma of these subjects showed an average lipemia clearing activity of 1.84 Grossman Units. This compares to a pretreatment normal value of 0.03 Grossman Unit. When the potassium polysaccharide sulfate was given without the potassium versenate no absorption of the drug from the track took place as evidenced by the fact that the 2 hours plasma of the same subjects showed a lipemia clearing activity of 0.03 Grossman Unit. It is known that potassium versenate per se has no lipemia clearing action.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A non-toxic antilipemic agent comprising a water-soluble nontoxic alkali salt of a sulfated polysaccharide selected from the class consisting of corn syrup solids and corn starch dextrin and containing an average of between about 5 and 15 glucose units per molecule joined predominantly by alpha 1,4 and alpha 1,6 linkages and containing between about 1.5 and 3 sulfate groups per glucose unit.

2. A non-toxic antilipemic agent according to claim 1, in which the polysaccharide has between about 8 and 12 glucose units per molecule.

3. A non-toxic antilipemic agent according to claim 1, in which the salt is a potassium salt.

4. A non-toxic antilipemic agent according to claim 1, in which the salt is a sodium salt.

5. A non-toxic antilipemic agent according to claim 1, containing between about 2 and 3 sulfate groups per glucose unit.

6. The process of producing an alkali salt of a polysulfuric acid ester of a polysaccharide consisting of polyglucose units having predominantly alpha 1,4 and alpha 1,6 linkages comprising: sulfating at a temperature below about 5° C. for not more than about 6 hours a polysaccharide selected from the class consisting of corn syrup solids and corn starch dextrin containing an average of between about 1 and 20 glucose units per molecule with chlorosulfonic acid in an amount of at least about 4 moles and not more than about 6.6 moles per glucose unit of said polysaccharide in the presence of a pyridine base under substantially anhydrous conditions, forming a water-soluble non-toxic alkali salt of said sulfated polysaccharide, precipitating from solution a fraction of said alkali salt containing an average of between about 5 and 15 glucose units per molecule and between about 1.5 and 3 sulfate groups per glucose unit.

7. The process defined in claim 6, in which the initial polysaccharide starting material contains an average of between 5 and 15 glucose units per molecule.

8. The process defined in claim 6 wherein the sulfation is carried out under non-depolymerising conditions.

9. The process defined in claim 6, in which the pyridine base medium contains a formamide.

10. The process defined in claim 6, in which the pyridine base medium contains a picoline.

11. The process defined in claim 6, in which the pyridine salt formed in the sulfation is precipitated with a neutral oxygen containing organic liquid miscible with water.

12. The process defined in claim 11, in which the organic liquid is a lower alkanol.

13. The process defined in claim 11, in which the organic liquid is acetone.

14. The process defined in claim 6, in which the product of the sulfation step is added to water and the fraction of the alkali salt of the sulfated polysaccharide is precipitated by neutralisation with alkali.

15. The process of producing a potassium salt of sulfated corn syrup solids comprising: prefractionating the corn syrup solids with a mixture of formamide and methanol to remove the lower molecular weight material, sulfating the residue with chlorosulfonic acid in at least about 4 moles and not more than about 6.6 moles per glucose unit of said corn syrup solids in a medium comprising picoline and formamide at 45° C. for 5 hours, adding the product to water, basifying with potassium hydroxide and collecting a solid residue comprising a potassium salt of sulfated corn syrup solids containing an average of between 8 and 12 glucose units per molecule and between 1.5 and 3.0 sulfate groups per glucose unit.

16. The process as defined in claim 6, wherein said fraction of said alkali salt is precipitated from an aqueous solution of potassium chloride of about 2 to 3% concentration by cooling to about 0° C.

17. A non-toxic antilipemic agent according to claim 1, in which the salt is an alkali-metal salt.

18. A non-toxic antilipemic agent according to claim 1 in which the polysaccharide contains an average of between about 8 and 12 glucose units per molecule, between 2 and 3 sulfate groups per glucose unit and the salt is an alkali-metal salt.

19. A non-toxic antilipemic agent according to claim 1, comprising a water-soluble salt of sulfated corn syrup solids containing an average of about 8.6 glucose units per molecule jointed predominately by alpha 1,4 and alpha 1,6 linkages and containing about 2.7 sulfate groups per glucose unit, and wherein the salt is of potassium.

References Cited in the file of this patent

UNITED STATES PATENTS

| | | |
|---|---|---|
| 2,589,226 | Carson | Mar. 18, 1952 |
| 2,638,469 | Alburn | May 12, 1953 |
| 2,686,779 | Jones | Aug. 17, 1954 |
| 2,697,093 | Jones | Dec. 14, 1954 |
| 2,786,833 | Wurzburg | Mar. 26, 1957 |

FOREIGN PATENTS

| | | |
|---|---|---|
| 529,082 | Canada | Aug. 14, 1956 |

UNITED STATES PATENT OFFICE
CERTIFICATE OF CORRECTION

Patent No. 3,017,407 January 16, 1962

Francis J. Petracek et al.

It is hereby certified that error appears in the above numbered patent requiring correction and that the said Letters Patent should read as corrected below.

Column 1, line 14, for "98" read -- 98 --; line 17, for "2" read -- 2 --; line 25, for "4" read -- 4 --; line 26, for "56" read -- 56 --; line 27, for "57" read -- 57 --; line 30, for "69" read -- 69 --; line 42, for "99" read -- 99 --; line 43, for "13" read -- 13 --; same line 43, after "May" insert -- 15, --; same column 1, line 51, for "227" read -- 227 --; column 2, line 32, for "43" read -- 43 --; column 8, line 43, for "so" read -- se --; line 46, for "so-caled" read -- so-called --; column 9, line 38, for "5° C." read -- 55° C. --.

Signed and sealed this 19th day of June 1962.

(SEAL)
Attest:

ERNEST W. SWIDER
Attesting Officer

DAVID L. LADD
Commissioner of Patents